(12) United States Patent
Gee et al.

(10) Patent No.: US 8,147,181 B2
(45) Date of Patent: Apr. 3, 2012

(54) DEVICE FOR INHIBITING THE FLOW OF OIL ALONG A ROTATING SHAFT

(75) Inventors: David Gee, Grenoside (GB); Jonathon Heslop, Lancashire (GB); Iain Taylor, Hudersfield (GB)

(73) Assignee: Cummins Turbo Technologies Limited, Huddersfield (GB)

( * ) Notice: Subject to any disclaimer, the term of this patent is extended or adjusted under 35 U.S.C. 154(b) by 0 days.

(21) Appl. No.: 12/757,987

(22) Filed: Apr. 10, 2010

(65) Prior Publication Data
US 2010/0196140 A1 Aug. 5, 2010

Related U.S. Application Data

(63) Continuation of application No. PCT/GB2008/003472, filed on Oct. 13, 2008.

(30) Foreign Application Priority Data

Oct. 13, 2007 (GB) .................................. 0720479.5

(51) Int. Cl.
*F01D 25/18* (2006.01)
(52) U.S. Cl. ...................................................... 415/111
(58) Field of Classification Search .................. 415/111, 415/110, 216.1, 229, 230
See application file for complete search history.

(56) References Cited

U.S. PATENT DOCUMENTS 5,066,192 A 11/1991 Honda et al.
7,086,842 B2 8/2006 Wild
7,789,616 B2 * 9/2010 Yen et al. ...................... 415/111

FOREIGN PATENT DOCUMENTS

DE 1 995 814 U 10/1968
EP 1 184 609 A2 3/2002

OTHER PUBLICATIONS

United Kingdom Search Report, GB0720479.5, Cummins Turbo Technologies Limited, Feb. 1, 2008.
PCT/GB2008/003472, International Search Report and Written Opinion, Cummins Turbo Technologies Limited, Jan. 28, 2009.

* cited by examiner

*Primary Examiner* — Richard Edgar
(74) *Attorney, Agent, or Firm* — Krieg DeVault LLP; Matthew D. Fair, Esq.

(57) ABSTRACT

An oil control device inhibits the flow of oil along a shaft (8) rotating about an axis. The oil control device comprises an annular body (19) for rotation with said shaft (8) and includes a first face (30) extending generally radially from said axis. A second radially outer circumferential surface (40) is provided, extending generally axially. An oil slinging groove (32) extends into said body (19) and has a mouth (37) defined between a first circumferentially extending rim (38) and a second circumferentially extending rim (39). The second rim (39) is spaced both radially and axially from the first rim (38). The groove (32) is defined at least in part by a wall (34) which meets the first rim (38) at an acute angle to a radial plane. The groove (32) is also defined at least in part by a wall (35) which meets the second rim (39) at an acute angle to the direction of the axis.

29 Claims, 6 Drawing Sheets

DEVICE FOR INHIBITING THE FLOW OF OIL ALONG A ROTATING SHAFT

CROSS REFERENCE TO RELATED APPLICATIONS

The present application is a continuation of PCT/GB2008/003472 filed Oct. 13, 2008, which claims priority to United Kingdom Patent Application No. 0720479.5 filed Oct. 13, 2007, each of which is incorporated herein by reference.

The present invention relates to an oil control device particularly suitable for incorporation in a rotating machine. Particularly, but not exclusively, the invention relates to an oil control device for incorporation in the bearing sealing system of turbomachinery, such as for instance a turbocharger turbine or compressor, or a power turbine.

Turbochargers are well known devices for supplying air to the intake of an internal combustion engine at pressures above atmospheric pressure (boost pressures). A conventional turbocharger essentially comprises an exhaust gas driven turbine wheel mounted on a rotatable shaft within a turbine housing connected downstream of an engine outlet manifold. Rotation or the turbine wheel rotates a compressor wheel mounted on the other end of the shaft within a compressor housing. The compressor wheel delivers compressed air to the engine intake manifold.

The turbocharger shaft is conventionally supported by journal and thrust bearings, including appropriate lubricating systems, located within a central bearing housing connected between the turbine and compressor wheel housings.

In a conventional turbocharger design, the turbocharger shaft passes from the bearing housing to the compressor housing through an appropriate passage in a compressor housing back plate, or oil seal plate, with a bearing assembly located adjacent the plate within the bearing housing. Lubricating oil is supplied to the thrust bearing assembly which can leak into the compressor housing. To combat this, it is conventional to incorporate in such bearing assemblies a seal assembly including an oil control device (often referred to as an "oil slinger"). A typical oil slinger is an annular component which rotates with the shaft and comprises a number of radially extending passages which effectively act as vanes for slinging oil away from the shaft and in particular away from the passage from the bearing housing into the compressor housing. An annular splash chamber located around the thrust bearing and sealing assembly collects the oil for re-circulation within the lubrication system. The splash chamber may be provided with drainage channels to drain oil to a sump.

Similarly, at the turbine end of the turbocharger, the turbocharger shaft typically passes through an aperture in a housing wall and is provided with bearing and oil seal assemblies. For instance, in one known arrangement the turbocharger turbine wheel is welded to a seal boss defined at the end of the turbocharger shaft, the seal boss having a larger diameter than the shaft and rotating within an annular passage through a housing wall separating the bearing housing from the turbine housing. Oil seal arrangements typically comprising one or more seal rings may be located in the annular gap surrounding the seal boss within the passage providing a labyrinth seal in the manner of conventional piston rings.

A power turbine also comprises an exhaust gas driven turbine wheel mounted on a shaft, but in this case the other end of the shaft is not connected to a compressor. For instance, in a turbocompound engine, two turbines are provided in series, both driven by the exhaust gases of the engine. One of the turbines drives a compressor to deliver pressurised air to the engine (i.e. is included in a turbocharger), and the other turbine, referred to as a power turbine, is used to generate additional power which is transmitted via a mechanical connection. For instance, in a power turbine a gear wheel may be fixed to the end of the shaft remote from the turbine and used to transmit power to the engine crank shaft via an appropriate coupling, for example a fluid coupling or other drive mechanism. Alternatively, the power may be transmitted by other means, for instance hydraulically or electrically. Such a power turbine again includes a shaft mounted on bearings located within a bearing housing, and which passes from the bearing housing to the turbine housing through a sealed aperture in a housing wall. The turbine wheel mounting arrangement, and the bearing and seal arrangement, may be substantially the same as those found in a turbocharger.

It is an object of the present invention to obviate or mitigate the problems of oil leakage in a rotating machine comprising a rotational shaft passing through a wall.

According to a first aspect of the present invention there is provided an oil control device for inhibiting the flow of oil along a shaft rotating about an axis, the oil control device comprising an annular body for rotation with said shaft and including a first face extending generally radially from said axis, a second radially outer circumferential surface extending generally axially, and an oil slinging groove extending into said body and having a mouth defined between a first circumferentially extending rim and a second circumferentially extending rim, wherein the second rim is spaced both radially and axially from the first rim, the groove is defined at least in part by a wall which meets the first rim at an acute angle to a radial plane, and the groove is defined at least in part by a wall which meets the second rim at an acute angle to the direction of the axis.

The first and second rims preferably extend around the entire circumference of the annular body so that the groove is an annular groove.

The groove preferably comprises a base, a first side wall extending from said first rim to said base, and a second side wall extending from said second rim to said base. In other embodiments the groove may be defined by a single curved wall which extends into the body from each of the first and second rims. In such embodiments, the angle defined between the wall and a radial plane at the first rim, or the angle defined between the wall and an axial direction at the second rim, may be measure relative to a tangent to the curved wall in the region of the respective rim.

In some embodiments the maximum width of the groove defined in a direction generally parallel to the mouth may be greater than or equal to the maximum depth of the groove defined in a direction generally perpendicular to the mouth.

In some embodiments the maximum width of the mouth defined between the first and second rims may be greater than or equal to the maximum depth of the groove.

According to a second aspect of the present invention there is provided a rotating machine comprising a shaft rotating about an axis and extending through an opening in a wall, and including an oil control device according to the first aspect of the present invention rotating coaxially with said shaft adjacent said opening for centrifugally displacing oil away from said shaft as it rotates thereby reducing flow of oil to said opening. The second surface will extend from the groove towards, and preferably into, said opening.

The machine may include a housing which includes said wall, and which defines an oil collecting groove radially recessed into the said housing and having an opening at least partially surrounding the shaft and axially overlapping the oil slinging groove of the oil control device.

A thrust bearing assembly may be associated with said shaft, wherein said oil control device is mounted for rotation between said wall and said thrust bearing assembly. The bearing assembly may define a radially extending face positioned adjacent said first face of the annular body of the oil control device, and the radius of said journal bearing face may be greater than the radius of the first rim of the oil slinging groove. In some embodiments the radius of said journal bearing face may be less than or equal to the radius of the second rim of the oil slinging groove.

The bearing abuts the first face of the oil control device.

The rotating machine may be a turbomachine such as a turbocharger or power turbine comprising a turbine wheel mounted to the shaft on the opposite side of said wall to said oil control device.

One or more seal rings may be disposed around said shaft within said opening to seal said shaft with respect to said opening.

The present invention also provides a rotating machine comprising a shaft rotating about an axis and extending through an opening in a wall, the shaft including an enlarged diameter portion which rotates within said opening comprises a first face extending generally radially from said shaft on a first side of said wall, and a second outer circumferential surface extending generally axially to said shaft and into said opening, wherein an oil slinging groove extends into said radially enlarged portion, the oil slinging groove having a mouth defined between a first circumferentially extending rim adjacent said first face and a second circumferentially extending rim adjacent said second surface, wherein the second rim is spaced both radially and axially from the first rim.

The first rim preferably has a smaller radius than the second rim.

Specific embodiments of the present invention will now be described, by way of example only, with reference to the accompanying drawings, in which.

Figure 1:
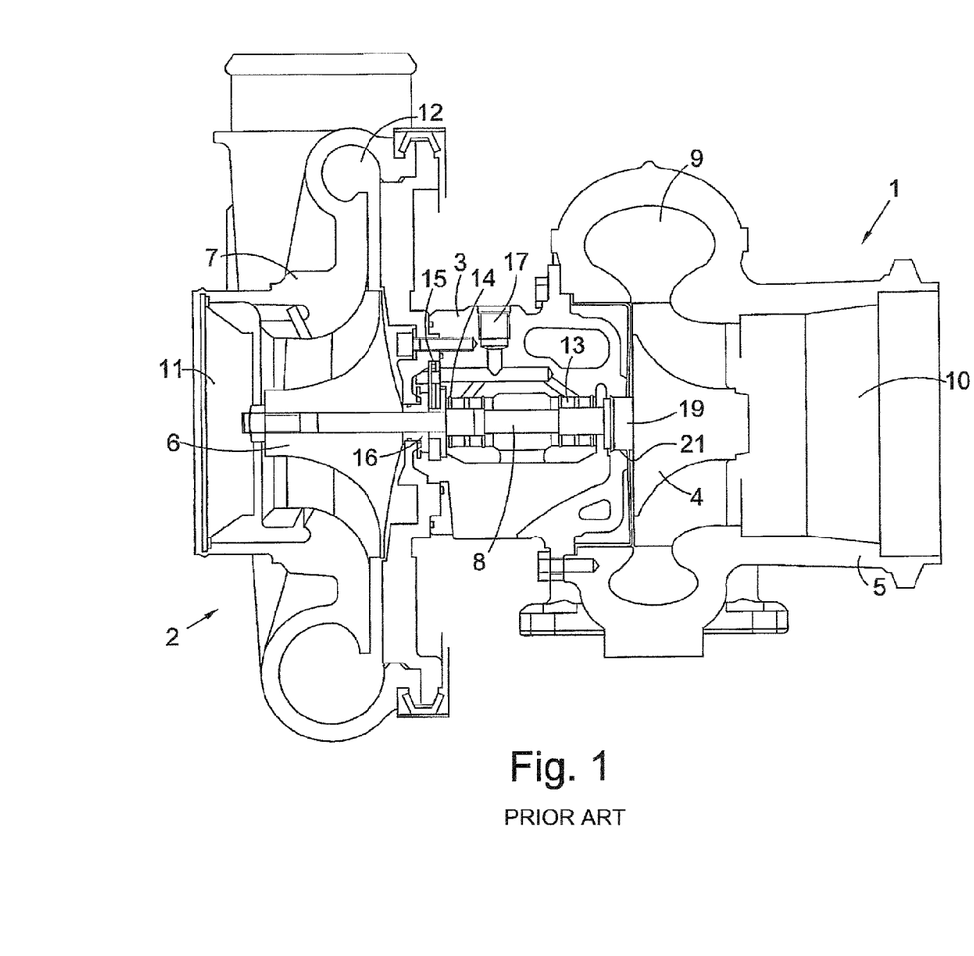
FIG. 1 is a cross-section through a conventional turbocharger.
Figure 2:
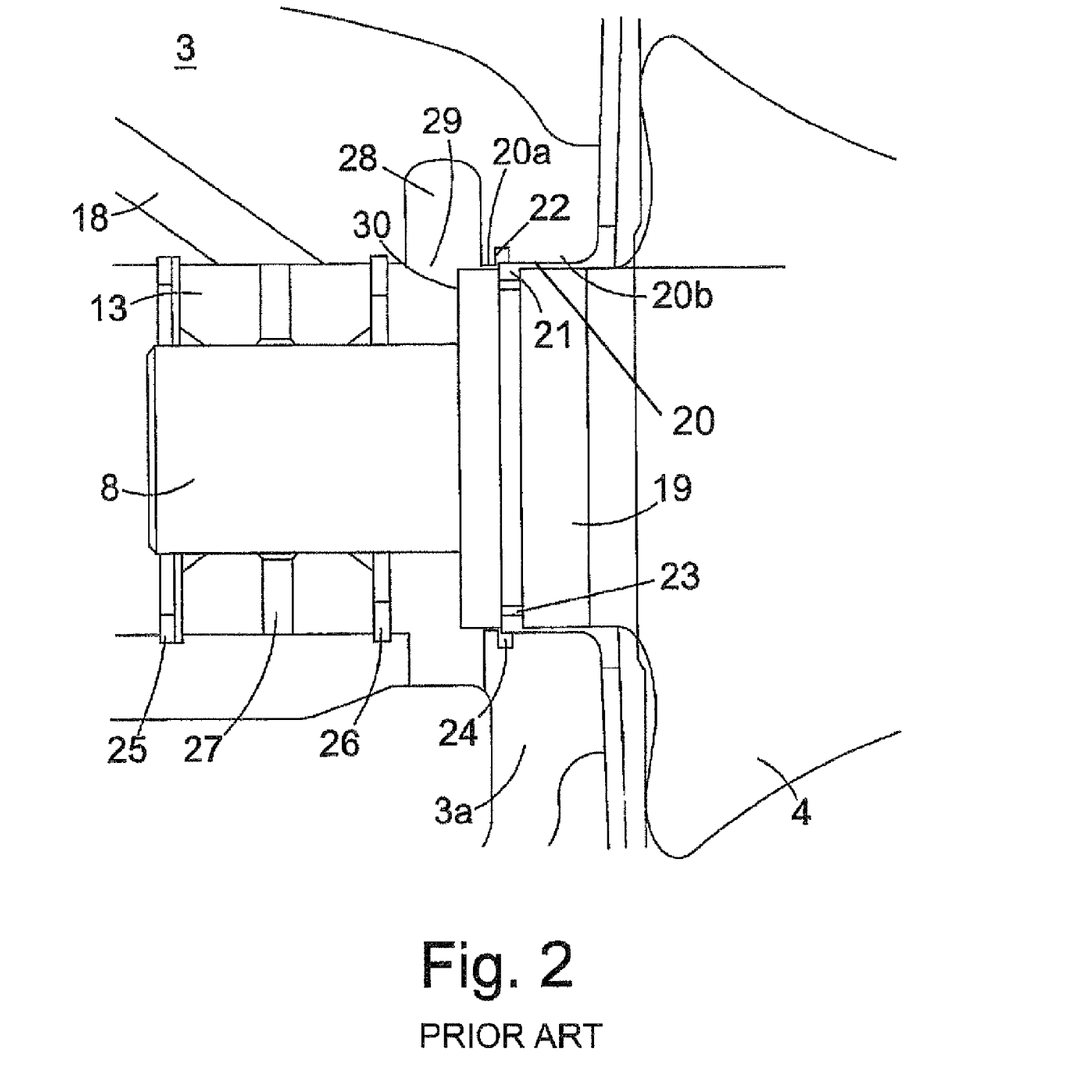
FIG. 2 is an expanded view of the turbine end bearing and oil seal assemblies of the turbocharger of FIG. 1.

Referring to FIGS. 1 and 2, the illustrated turbocharger comprises a turbine 1 joined to a compressor 2 via a central bearing housing 3. The turbine 1 comprises a turbine wheel 4 rotating within a turbine housing 5. Similarly, the compressor 2 comprises a compressor wheel 6 which rotates within a compressor housing 7. The turbine wheel 4 and compressor wheel 6 are mounted on opposite ends of a common turbocharger shaft 8 which extends through the central bearing housing 3.

The turbine housing 5 has an exhaust gas inlet volute 9 located annually around the turbine wheel 4 and an axial exhaust gas outlet 10. The compressor housing 7 has an axial air intake passage 11 and a compressed air outlet volute 12 arranged annually around the compressor wheel 6. In use, the turbine wheel 4 is rotated by the passage of exhaust gas from the annular exhaust gas inlet 9 to the exhaust gas outlet 10, which in turn rotates the compressor wheel 6 which thereby draws intake air through the compressor inlet 11 and delivers boost air to the intake of an internal combustion engine via the compressor outlet volute 12.

The turbocharger shaft 8 rotates on fully floating journal bearings 13 and 14 housed towards the turbine end and compressor end respectively of the bearing housing 3. The compressor end bearing assembly 14 further includes a thrust bearing 15 which interacts with an oil seal assembly including an oil slinger 16. Details of the compressor end bearing and oil seal are not important to an understanding of the present invention and will not be described further. Oil is supplied to the bearing housing from the oil system of the internal combustion engine via oil inlet 17 and is fed to the bearing assemblies by oil passageways 18.

The turbine end bearing assembly and oil seal is shown in greater detail in FIG. 2. The turbine wheel 4 is joined to the end of the turbocharger shaft 8 at a seal boss 19. Generally the seal boss 19 is formed integrally with the shaft 8 and is joined (for instance by friction welding) to a boss portion on the turbine wheel 4. The seal boss 19 extends through an annular passage 20 in a bearing housing wall 3a and into the turbine housing. The seal boss 19 is sealed with respect to the annular passage 20 by a seal ring 21 which is typically an overlapping type split ring seal.

In more detail (referring in particular to FIG. 2) the passage 20 through the bearing housing wall 3a is radially stepped having a relatively narrow diameter inboard portion 20a and a relatively large diameter outboard portion 20b. This provides an annular abutment shoulder 22 for the ring seal 21 which sits within an annular groove 23 provided in the outer surface of the seal boss 19. The seal ring 21 is stationary with respect to the bearing housing 3 and is provided to prevent the leakage of air/oil through the passage 20. The abutment shoulder 22 prevents the seal ring 21 creeping inboard towards the bearing housing 3. In order to provide an abrupt, none radiused, change of diameter of the passage 20 a slight annular recess 24 is cut back in to the surface of the annular passage 20 to define the shoulder 22.

The turbine end journal bearing 13 is located between circlips 25 and 26. Oil is fed to the bearing 13 via oil passageway 18 and the bearing 13 is provided with circumferentially spaced radial holes 27 for oil to pass to the turbocharger shaft 8. An annular oil return groove 28 is radially recessed into the bearing housing wall adjacent the passage 20 through the housing wall 3a. The oil return groove 28 surrounds the shaft 8 and has an annular entrance 29.

The seal boss 19 extends slightly into the bearing housing 18 beyond the inner surface of the bearing housing wall 3a and axially overlaps the entrance 29 to the oil groove 28. The inboard end of the seal boss 19 forms a radial shoulder around the shaft 8 having an annular face 30. As the turbocharger shaft 8 rotates, oil reaching the annular face 30 is radially dispelled and propelled from the face 30 of the boss 19 is into the oil groove 28 from which it drains back to the engine crank case via an oil drain hole 31 (shown in FIG. 1). The provision of the oil groove 28 thus prevents oil from accumulating in the region of the passage 20, and similarly ensuring that the boss 19 protrudes into the bearing housing 3 ensures that oil is projected into the oil groove 28 and not towards the annular gap defined where the boss 19 passes through the passage 20.

Investigations have however shown that with the conventional arrangement described above and illustrated in FIGS. 1 and 2, a significant portion of the oil propelled into the oil groove 28 flows back along the inner wall of the bearing housing 3a to the passageway 20. The present invention, as exemplified by the embodiment illustrated in FIGS. 3 and 4, addresses this problem.

Figure 3:
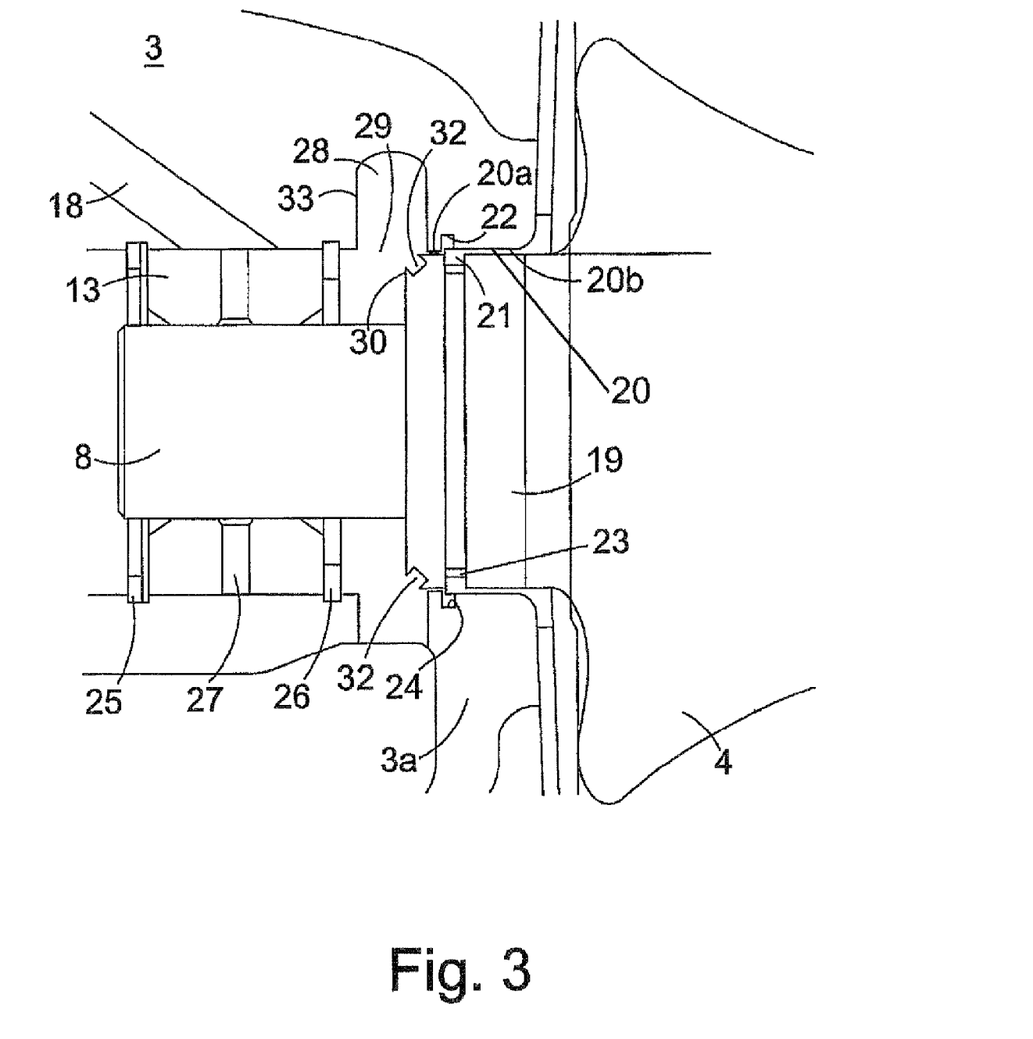
FIG. 3 illustrates a modification of the turbine wheel and shaft assembly of FIG. 2 in accordance with the present invention.
Figure 4:
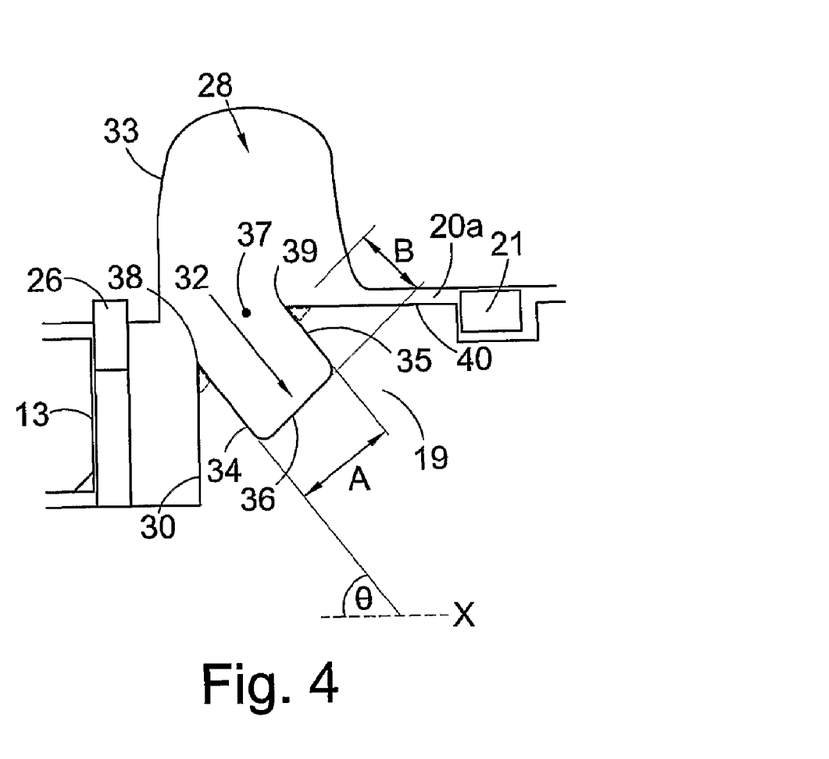
FIG. 4 is an enlarged view of part of the wheel and shaft assembly of FIG. 3.

Referring to FIGS. 3 and 4, the illustrated assembly is identical to that of FIG. 2, except that in accordance with the present invention the annular shoulder of the seal boss 19 is provided with an annular groove 32 which functions as an oil slinger. In this way the oil slinging groove 32 is set into said shoulder of the seal boss 19 and runs along said rim. The groove 32 comprises a first annular side wall 34, a second annular side wall 35 substantially parallel to the first annular side wall 34, and an annular base 36. The first annular side wall 34 lies on a conical surface which subtends an angle $\theta$ at the shaft axis X, and which intersects the plane containing the annular face 30 before intersecting a cylindrical surface containing the cylindrical wall 40 of the seal boss 19. The second side wall 35 lies on the surface of a cone which again subtends an angle $\theta$ at the axis X, but which intersects a cylindrical surface containing the radially outer surface of the seal boss 19 before intersecting a plane containing the annular face 30. As such, the groove 32 has a first annular rim 38 defined where side wall 34 meets the annular seal boss face 30, and a second annular rim 39 defined where the second side wall 35 meets the radially outer surface of the cylindrical wall 40 of the seal boss 19. The second rim 39 is spaced both axially and radially from the first rim 38. The groove 32 has an annular mouth 37 defined between the first rim 38 and the second rim 39 and which lies on a conical surface which intersects the annular face 30 and the cylindrical wall 40. The annular base 36 lies on a conical surface which is substantially perpendicular to the side walls 34 and 35 and parallel to the mouth 37. As is clear from the figures, the annular face 30, which is radial to the shaft axis X, is situated inboard of the groove 32 with respect to the turbocharger bearing housing.

As the shaft 8 rotates, oil reaching the boss 19 and entering the oil slinging groove 32 is projected not only radially away from the shaft 8, but also axially away from the passage 20. In this particular embodiment, the oil will be projected on to a side surface 33 of the oil groove 28 remote from the passage 20 and thus the likelihood of oil flowing back towards the passage 20 is greatly reduced.

The above embodiment of the present invention thus provides an effective method of reducing oil leakage across the turbine end seal without adding any additional components to the seal assembly, and with only minimal modification to conventional turbocharger components, namely appropriate profiling of the annular shoulder of the seal boss 19.

In the illustrated embodiment the first side wall 34 forms a relatively sharp annular edge where it meets the annular face 30 at the rim 38, and the second side wall 35 forms a relatively sharp annular edge where it meets the cylindrical wall 40 at the rim 39. In other embodiments the rims 38 and 39 may be chamfered, or may be blunted as for instance shown in dotted lines in FIG. 4. To some extent, the degree of sharpness of the rims 38 and 39 may be determined by the technique used to form the groove 32. It is expected that rims having sharp edges as illustrated will improve oil slinging performance of the groove 32.

The oil slinging groove rims 38 and 39 lie on a conical surface which in the illustrated embodiment subtends an angle 90°−$\theta$ at the axis X of the shaft. In other embodiments of the invention in which the mouth 37 of the groove 32 is not substantially perpendicular to the side walls 34 and 35, the angle may differ from 90°−$\theta$. The angle will, however, be greater than 0° and less than 90°. In some embodiments the angle will be greater than 20° and in other embodiments will be greater than 30°. In some embodiments the angle will be less than 70° and in other embodiments less than 60°.

The first side wall 34 meets the annular face 30 at an acute angle. A line bisecting that angle and extending to the axis X, may in some embodiments subtend an angle $\alpha$ at the axis which is less than or equal to 80°. In some embodiments the angle $\alpha$ may be less than 60°, and in other embodiments may be less than 45°. In some embodiments the angle $\alpha$ is greater than or equal to 10°, in other embodiments it is greater than or equal to 20° or greater than or equal to 30°.

Similarly, the second side wall 35 meets the outer circumferential surface 40 of the seal boss 20 at an acute angle. A line bisecting that angle and extending to the axis X, may subtend an angle $\beta$ at the axis X which is less than or equal to 80°. In some embodiments the angle may be less than or equal to 60° and on other embodiments it may be less than or equal to 45°. In some embodiments the angle may be at least 10°, and in others may be at least 20° or at least 30°.

In the illustrated embodiment in which the side wall 34 is parallel to the side wall 35, the angle $\alpha$ is greater than the angle $\beta$. In the illustrated embodiment, the different between the second angle $\beta$ and the first angle $\alpha$ is less than 0°. In some embodiments that difference may be −20° or less, and in others it may be −40° or less. In some embodiments the difference will be −90° or more, and in other embodiments −70° or more. In yet further embodiments the difference may be −50° or more.

The first rim 38 lies at a smaller radius (relative to the axis X) than the second rim 39, (and may lie at a smaller radius than the radially inner extremity of the second side wall 35). In some embodiments the ratio of these radii is at least 29:24. In other embodiments the ratio is 27:24 and in yet other embodiments the ratio is 25:24.

In some embodiments it is expected that the radius of the first rim 38 will be smaller than the outer radius of the journal bearing 13. In some embodiments the ratio of the radius of the radius of the first rim 38 to the radius of the journal bearing is at least 24:25. In other embodiments the ratio is at least 24:27, and in yet further embodiments the ratio is at least 24:29.

The base 36 of the groove 32 need not necessarily extend perpendicular to either the first side wall 34 or the second side wall 35. Neither is it necessary for the intersection of the base 36 with each of the side walls 34 and 35 to be radiused as shown in FIG. 4.

The separation A of the side walls 34 and 35 may differ from that illustrated, and may differ in proportion to the depth B of the groove defined as the average of the height of the side walls 34 and 35. For instance, in some embodiments the ratio A:B may be about 2.5:1 and in other embodiments it may be less than this. For example, the ratio may be less than 2:1 or even 1.5:1. In yet further embodiments a minimum ratio may be 0.5:1, 0.75:1 or 1:1. In embodiments in which the side walls 34 and 35 are not parallel the dimension A may be the maximum width of the groove 32 or the width of the mouth of the groove. Similarly, in embodiments in which the base 36 is not perpendicular to side wall 34 and/or 35, the dimension B may be the maximum depth of the groove measured from the mouth of the groove.

The overall dimension of the groove 32 may to some extent depend on the dimension of the seal boss 19. In typical embodiments the seal boss 19 may have a diameter or between about 15 mm and 40 mm, but diameters outside of this range are also possible.

It will also be appreciated that details of the shaft bearing and oil seal arrangements may be entirely conventional, and vary from those illustrated. For instance, the oil seal may comprise more than one ring seal 21 and the passage 20 may be a plain bore of constant diameter. Similarly, the detailed form of the bearing housing and turbine housing may vary from that illustrated. For example, in the illustrated embodiment the passage from the bearing housing to the turbine housing is formed in a wall of the bearing housing. In other arrangements the wall separating the two housings may form part of the turbine housing rather than the bearing housing.

It will also be appreciated that the exact form of the oil groove 28 may vary. For instance, in some turbocharger bearing housing designs the oil groove may extend nearly 360° around the shaft, and in others the groove may extend through a smaller angle. Again, the details of the oil groove 28 can be entirely conventional. Alternatively, the oil groove could be modified by angling the side walls of the groove, and in particular the inboard side wall which in some embodiments may enhance the oil collecting performance.

Figure 5:
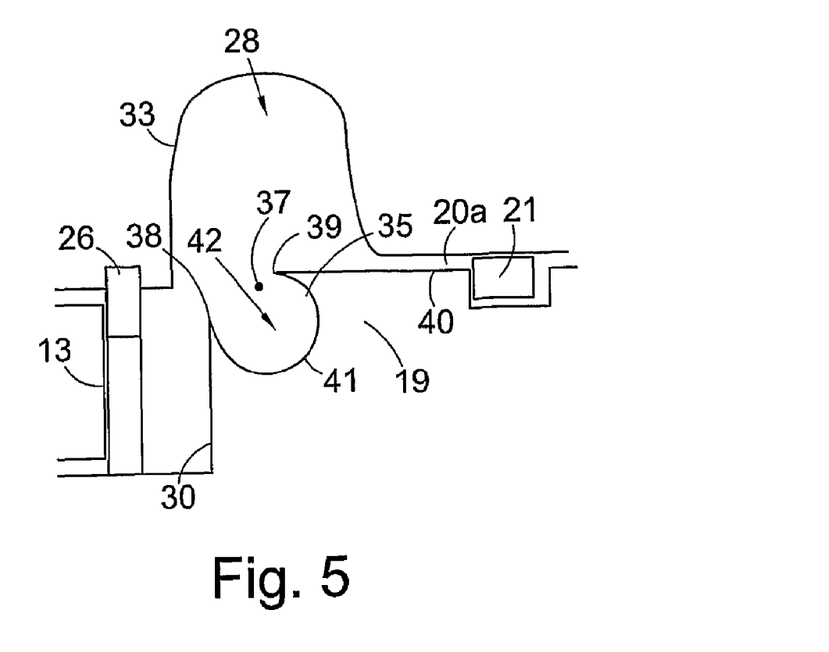
FIG. 5 is a schematic illustration of an alternative embodiment of the invention.

In the illustrated embodiment the side walls 34 and 35 lie on conical surfaces which intersect a conical surface on which the bottom wall 36 lies (and also intersect a conical surface containing the rims 38 and 39). In alternative embodiments the bottom wall 36 may be concave or even convex, and curve away from any particular conical surface. In yet further embodiments, the side wall 34 and/or side wall 35 may be concave or convex and curve away from any particular conical surface. For example, the walls 34, 35 and 36 might be replaced by a single concave wall 41 as illustrated schematically in FIG. 5. With a groove 42 configured as shown in FIG. 5, the groove still has a mouth 37 defined between annular rim 38 and annular rim 39 which lie on a conical surface which intersects a cylindrical surface containing the seal boss wall 40 and the radial plane containing the annular face 30. Although curved in cross-section as illustrated, the groove may have an overall dimension which broadly corresponds to the various possible relative dimensions of groove 32 of FIG. 4.

Although in the embodiments of the invention illustrated in FIG. 4 and FIG. 5, the groove 32/42 has a uniform cross-section around its circumference, in other embodiments, the cross-section may vary. For instance, the groove may be wider or deeper at some circumferential positions than at others. Similarly, the shape of the walls 34, 35, 36 and 41 and/or their orientation relative to one another, may vary around the circumference of the groove. Similarly, the radius of each rim 38 and 39, and/or width of the mouth of the groove, may vary around the circumference of the groove.

Figure 6:
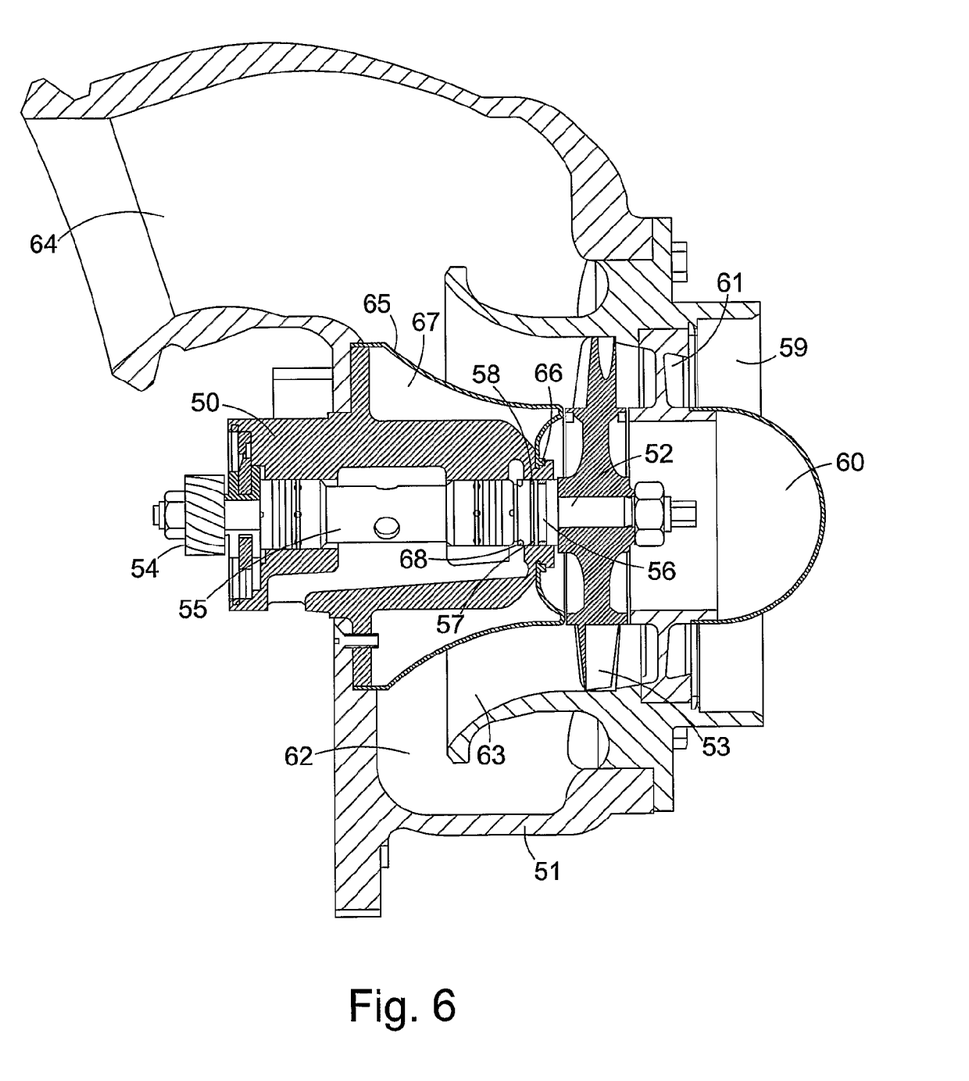
FIG. 6 illustrates a power turbine incorporating the present invention.

FIG. 6 illustrates application of the present invention to an axial flow power turbine. The turbine includes a bearing housing 50 and an axial flow turbine housing 51. A shaft 52 extends through the bearing housing 50 and supports at one end a turbine wheel 53 and at the other end a drive gear 54. The shaft is supported on a one piece bearing 55 which is substantially the same as the one piece bearing disclosed in U.S. Pat. No. 6,905,316 and will not be described in further detail. Similarly, the turbine wheel 53 is joined to the end of the shaft 52 at a seal boss 56 which extends through an annular passage 57 in a wall of the bearing housing 50. Seal boss 56 is sealed with respect to the passage 57 by a seal ring 58, which may be a split overlapping ring.

The turbine housing 51 comprises an axial annular inlet passage 59 defined around a domed nozzle 60 and includes a stationary annular vane array 61. Exhaust gas flows through the annular inlet passage 59, through the turbine wheel 53, and into an annular collector portion 62 of the turbine outlet via an annually flared turbine diffuser portion 63 which is an extension of the inlet passage 59. Gas exits the turbine via a generally axially oriented outlet 64. A pressed metal heat shield 65 is provided to separate the bearing housing 50 from the exhaust gas flow. At its radially outermost periphery the heat shield 65 is clamped between the bearing housing 50 and the turbine housing 51. The radially inner periphery of the heat shield 65 contacts the bearing housing 35 around the shaft passage 57 and is held in position by a retaining ring 66. A heat shield cavity 67 is defined between the heat shield 65 and the bearing housing 51 to reduce heat transfer to the bearing housing 51 from the hot exhaust gas flowing through the turbine.

In accordance with the present invention the seal boss 56 is provided with an oil slinging groove 68. The oil slinging groove function in exactly the same way as the oil slinging groove 32 of FIGS. 3 and 4. As illustrated the oil slinging groove 68 has substantially the same configuration as the oil seal groove 32 illustrated in FIGS. 3 and 4. The configuration of the oil slinging groove 68 could however be modified in the same way as discussed above in relation to the oil slinging groove 32. For instance, the oil slinging groove 68 could have a configuration as is illustrated in FIG. 6.

It will be appreciated that the present invention can be applied to other forms of turbocharger or power turbines differing from those illustrated, and indeed to other turbomachinery or rotating machines comprising a rotating shaft.

Figure 7:
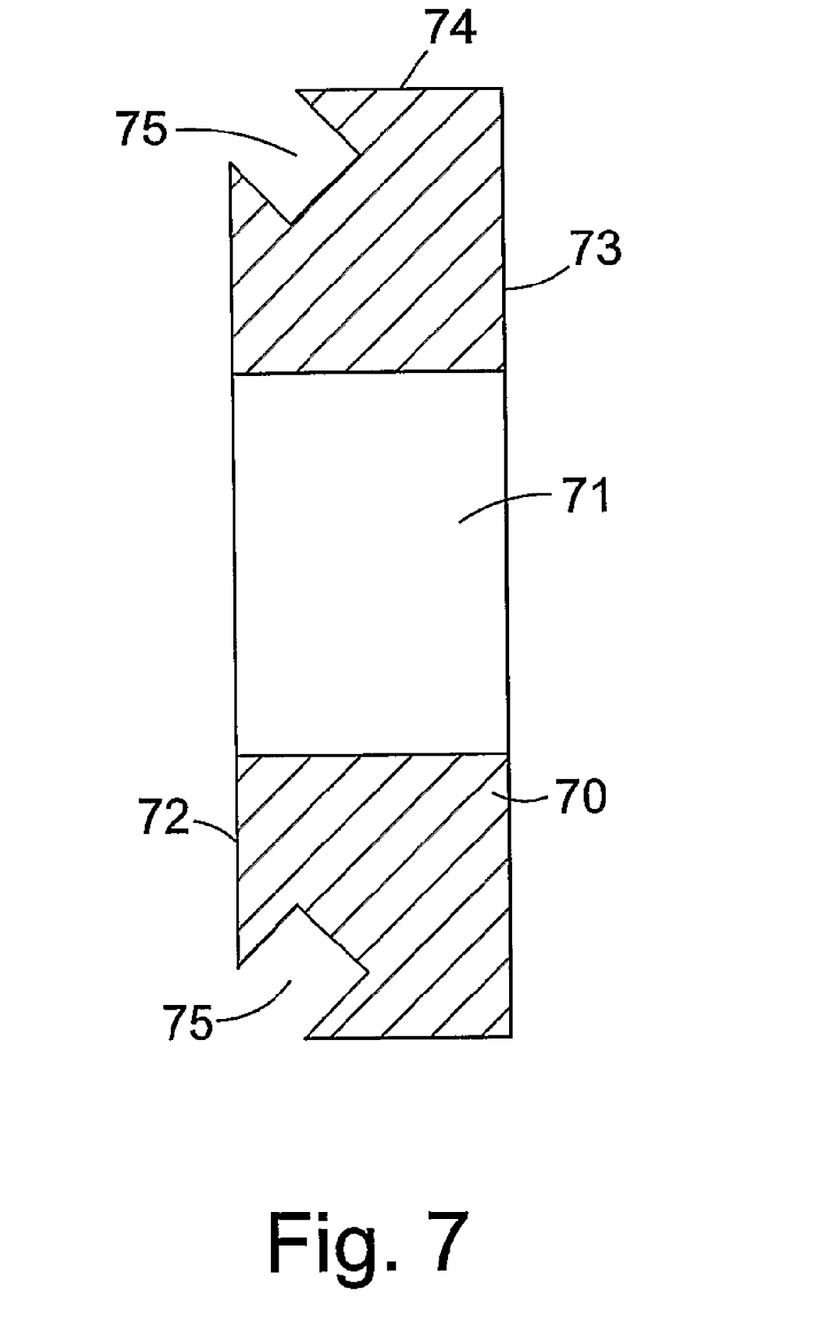
FIG. 7 is a schematic illustration of a further embodiment of the present invention.

The present invention may also be implemented as an oil slinger which is not integral with any part of an existing bearing or shaft assembly. Such an embodiment is illustrated in FIG. 7 which shows an oil slinger according to the present invention which comprises an annular body 70 defining a central aperture 71. The body 70 defines opposing annular faces 72 and 73 and a radially outer cylindrical wall 74. An annular oil slinging groove 75 is provided which opens to the annular face 72 and outer wall 74 in accordance with the present invention. The oil slinger of FIG. 7 can for instance be mounted to a rotating shaft in any application where a conventional oil slinger might be used. For example, such an oil slinger can be used at the turbine or compressor ends of a turboshaft of a turbocharger, or as part of the turbine end sealing arrangement of a power turbine. The oil slinger is not, however, limited in its use to turbomachinery and can be used in any rotating machine to help stem a flow of oil through an aperture through which a rotating shaft passes.

It will be appreciated that the oil slinging groove 75 may have a configuration substantially the same as that shown in FIG. 4, 5, or 6 or any of the possible variations thereof as described above.

Other possible modifications and applications of the present invention will be apparent to the appropriately skilled person.

The invention claimed is:

1. An oil control device for inhibiting the flow of oil along a shaft rotating about an axis, the oil control device comprising an annular body for rotation with said shaft and including a first face extending generally radially from said axis, a second radially outer circumferential surface extending generally axially, and an oil slinging groove extending into said body and having a mouth defined between a first circumferentially extending rim and a second circumferentially extending rim, wherein the second rim is spaced both radially and axially from the first rim, the groove is defined at least in part by a first side wall which meets the first rim at an acute angle to a radial plane, and the groove is defined at least in part by a second side wall which meets the second rim at an acute angle to the direction of the axis, wherein the groove further comprises a base, the first side wall extends from the first rim to said base and the second side wall extends from the second rim to said base, the separation between the first and second side walls is less than double the depth of the groove.

2. An oil control device according to claim 1, wherein the first and second rims extend around the entire circumference of the annular body so that the groove is an annular groove.

3. An oil control device according to claim 1, wherein the mouth of the groove opens at said first generally radially extending face to define said first rim, and opens at said second generally axially extending surface to define said second rim.

4. An oil control device according to claim 1, wherein at least one of said first side wall said second side wall lies on a conical surface subtending an acute angle θ at said axis.

5. An oil control device according to claim 1, wherein said first and second side walls are generally parallel to each other.

6. An oil control device according to claim 1, wherein said base lies on a conical surface subtending an angle at said axis and extends generally perpendicular to the first and/or second side wall.

7. An oil control device according to claim 1, wherein the maximum width of the groove defined in a direction generally parallel to the mouth is greater than or equal to the maximum depth of the groove defined in a direction generally perpendicular to the mouth.

8. An oil control device according to claim 7, wherein the maximum width of the mouth defined between the first and second rims is greater than or equal to the maximum depth of the groove.

9. An oil control device according to claim 1, wherein said first face lies on a plane extending substantially perpendicular to the axis, and said second face lies on a cylindrical surface extending substantially axially to the axis.

10. A rotating machine comprising a shaft rotatable about an axis and extending through an opening in a wall, and including an oil control device according to claim 1, wherein said oil control device is rotatable rotating coaxially with said shaft and wherein said oil control device is arranged adjacent said opening for centrifugally displacing oil away from said shaft as it rotates thereby reducing flow of oil to said opening.

11. A rotating machine according to claim 10, wherein the rotating machine is a turbomachine comprising a turbine wheel mounted to the shaft on the opposite side of said wall to said oil control device.

12. A rotating machine according to claim 11, comprising a turbine housing and a bearing housing separated by said wall, the shaft being mounted on bearing systems housed within said bearing housing and provided with oil for lubrication, and the turbine wheel being mounted to said shaft for rotation in the turbine housing.

13. A rotating machine according to claim 12, wherein the turbomachine is a turbocharger.

14. A rotating machine according to claim 12, wherein said turbomachine is a power turbine supporting a drive connection at an end of the shaft remote from the turbine.

15. A rotating machine according to claim 10, further comprising a seal ring disposed around said shaft within said opening to seal said shaft with respect to said opening.

16. A rotating machine according to claim 10, comprising a housing which includes said wall, and which defines an oil collecting groove radially recessed into the said housing and having an opening at least partially surrounding the shaft and axially overlapping the oil slinging groove of the oil control device.

17. A rotating machine according to claim 10, further comprising a journal bearing assembly associated with said shaft, wherein said oil control device is mounted for rotation between said wall and said journal bearing assembly.

18. A rotating machine according to claim 17, wherein said journal bearing assembly defines a radially extending face positioned adjacent said first face of the annular body of the oil control device, and wherein the radius of said journal bearing face is greater than the radius of the first rim of the oil slinging groove.

19. A rotating machine according to claim 17, wherein said journal bearing assembly defines a radially extending journal bearing face positioned adjacent said first face of the annular body of the oil control device, and wherein the radius of said journal bearing face is less than or equal to the radius of the second rim of the oil slinging groove.

20. A rotating machine according to claim 17, wherein the journal bearing assembly abuts the first face of the oil control device.

21. An oil control device according to claim 1, wherein at least one of the first rim and the second rim is champhered.

22. A rotating machine comprising a shaft rotatable about an axis and extending through an opening in a wall, the shaft including an enlarged diameter portion which is rotatable within said opening and which comprises a first face extending generally radially from said shaft on a first side of said wall, and a second outer circumferential surface extending generally axially to said shaft and into said opening, wherein an oil slinging groove extends into said radially enlarged portion, the oil slinging groove having a mouth defined between a first circumferentially extending rim adjacent said first face and a second circumferentially extending rim adjacent said second surface, wherein the second rim is spaced both radially and axially from the first rim, wherein said mouth defines a width that is less than double a depth of the groove.

23. A rotating machine according to claim 22, wherein the first and second rims extend around the entire circumference of said radially enlarged portion of the shaft so that the oil slinging groove is an annular groove.

24. A rotating machine according to claim 22, wherein said rotating machine is a turbomachine, and wherein said wall separates a bearing housing from a turbine housing, the shaft being supported on bearing assemblies housed within the bearing housing on said first side of the wall, the bearing housing being provided with oil passages for delivering oil to the bearing assemblies.

25. A rotating machine according to claim 24, wherein the bearing housing defines an oil collecting groove radially recessed into the bearing housing adjacent said wall and having a circumferentially extending opening at least partially surrounding the shaft and axially overlapping the oil slinging groove.

26. A rotating machine according to claim 24, wherein at least one of the bearing assemblies defines a radially extending bearing face positioned adjacent the first radial face of said enlarged diameter portion of the shaft, and wherein the radius of said bearing face is greater than the radius of the first rim.

27. A rotating machine according to claim 24, wherein at least one of the bearing assemblies defines a radially extending bearing face positioned adjacent the first radial face of said enlarged diameter portion of the shaft, and wherein the radius of said bearing face is less than or equal to the radius of the second rim.

28. A rotating machine according to claim 24, wherein at least one of the bearing assemblies abuts the radial face of the enlarged diameter portion of the shaft.

29. A turbomachine according to claim 22, further comprising at least one seal ring disposed within said opening between said shaft and said wall.

* * * * *

UNITED STATES PATENT AND TRADEMARK OFFICE
CERTIFICATE OF CORRECTION

PATENT NO.         : 8,147,181 B2
APPLICATION NO.    : 12/757987
DATED              : April 3, 2012
INVENTOR(S)        : David Gee, Jonathon Heslop and Iain Taylor Page 1 of 1

It is certified that error appears in the above-identified patent and that said Letters Patent is hereby corrected as shown below:

Col. 9, Line 34, delete the word "rotating".

Signed and Sealed this
Twenty-eighth Day of August, 2012

David J. Kappos
*Director of the United States Patent and Trademark Office*